United States Patent [19]

Lohrberg et al.

[11] 4,278,568

[45] Jul. 14, 1981

[54] PROCESS OF MANUFACTURING SHEET METAL ELEMENTS OR STRIP HAVING A CATALYTIC SURFACE STRUCTURE

[75] Inventors: Karl Lohrberg, Heusenstamm; Heinz Wüllenweber, Frankfurt am Main; Jürgen Müller, Karben; Bernd Sermond, Asslar, all of Fed. Rep. of Germany

[73] Assignee: Metallgesellschaft Aktiengesellschaft, Frankfurt am Main, Fed. Rep. of Germany

[21] Appl. No.: 50,018

[22] Filed: Jun. 19, 1979

[30] Foreign Application Priority Data

Jul. 7, 1978 [DE] Fed. Rep. of Germany ....... 2829901

[51] Int. Cl.$^3$ .................. B01J 25/00; B01J 25/02; B01J 35/02
[52] U.S. Cl. .................. 252/472; 252/425.3; 252/476; 252/477 Q; 252/477 R; 75/208 CS; 75/208 R; 75/222; 204/290 R
[58] Field of Search .................. 252/425.3, 472, 476, 252/477 Q, 477 R; 75/208 CS, 208 R, 222; 204/290 R

[56] References Cited

U.S. PATENT DOCUMENTS

| 3,073,697 | 1/1963 | Friese et al. ........... 75/208 R |
|---|---|---|
| 3,150,011 | 9/1964 | Winsel et al. .......... 75/208 R |
| 3,481,789 | 12/1969 | Winsel ................ 75/222 X |

FOREIGN PATENT DOCUMENTS

| 206867 | 12/1959 | Austria . |
|---|---|---|
| 1145357 | 3/1969 | United Kingdom ........... 252/477 Q |

*Primary Examiner*—W. J. Shine
*Attorney, Agent, or Firm*—Sprung, Felfe, Horn, Lynch & Kramer

[57] ABSTRACT

In the manufacture of sheet metal elements or strip having a catalytic surface structure, a mixture of skeleton material powder, and of Raney alloy powder is rolled onto the starting sheet metal element or strip substrate, sintered in a reducing atmosphere, whereafter the soluble component of the Raney alloy is dissolved out.

To ensure an adequate adherence of the catalytic surface structure, the operation in which the above-mentioned mixture is rolled onto the substrate is accompanied by a simultaneous cold-working of the substrate with a deformation of 20 to 60% within each cold-forming step.

The coated sheet metal element or strip substrates or any spherical bodies made therefrom serve as electrodes in electrolytic processes.

11 Claims, No Drawings

PROCESS OF MANUFACTURING SHEET METAL ELEMENTS OR STRIP HAVING A CATALYTIC SURFACE STRUCTURE

BACKGROUND OF THE INVENTION

1. Field of the Invention

This invention relates to a process of manufacturing sheet metal elements or strip having a catalytic surface structure, in which a mixture containing skeleton powder and Raney alloy powder in a ratio of 1:3 to 3:1 is applied to a starting sheet metal element or starting strip and bonded thereto by roll cladding and is subsequently sintered in a reducing atmosphere at temperatures above 600° C., and the soluble component of the Raney alloy is dissolved out by a treatment with an alkaline or acid solution, and to the use of the resulting sheet metal element or strip having a catalytic surface structure as an electrode in electrolysis or as a catalyst in chemical reduction processes.

2. Discussion of the Prior Art

Double-skeleton catalyst electrodes, also known as DSC electrodes, have a high electrical conductivity and a high catalytic activity and for this reason can be used as electrodes in various types of electrolyzers, as electrodes in fuel elements and as catalysts for chemical reactions in which Raney catalysts are usually employed.

Such compact DSC electrodes have the disadvantage that when made in a thickness of a few tenths of a millimeter, which is adequate from the aspect of catalytic activity, they lack an adequate mechanical strength. On the other hand, an unreasonably large amount of catalyst will be required if such electrodes are made in a thickness which is adequate from the aspect of mechanical strength.

It is known that this disadvantage can be avoided in that a compact or porous metal substrate is coated with catalytic material. To that end, a mixture of a so-called skeleton material, serving as a carrier, and of Raney alloy is applied to and then pressed or rolled onto the metal substrate and sintered at temperatures above preferably 600° C. in a reducing atmosphere, and the soluble component of the Raney alloy is finally dissolved out (Austrian Patent Specification No. 206,867).

The process just outlined is of advantage if the catalyst mixture is consolidated on the substrate by the application of pressure. This requires the application of a pressure of an order of 1000 kg/cm² so that only DSC electrodes which are small in area can be manufactured with a reasonable equipment expenditure. Such small electrodes cannot be used or can be used only with difficulty, particularly in electrolyzers. Whereas even DSC electrodes large in area can be made if the catalyst mixture can be consolidated as it is bonded to compact metal surfaces by roll cladding, such operation is impracticable because it has been found that by the roll cladding the mixture of skeleton material and Raney alloy is pushed off the metal surface so that any catalyst layer which can be applied in this manner will be extremely thin and cannot be employed with useful results.

It is an object of the invention to provide a process for the manufacture of sheet metal elements or strip having a catalytic surface structure a process which process avoids the known disadvantages, particularly those mentioned hereinbefore, and particularly permits the manufacture of DSC electrodes large in area and can be carried out with a low equipment expenditure.

SUMMARY OF THE INVENTION

This object is accomplished in that the process of the kind described first hereinbefore is improved according to the invention so that the mixture is bonded to the sheet metal element or strip by roll cladding and said sheet metal element or strip is cold-formed at the same time with a deformation of 20 to 60% in one forming step.

By the statement "deformation of 20 to 60% in one forming step" it is intended to state that whether the cold-forming is effected in one step or in a plurality of steps, a deformation within the stated range is to be effected in each cold-forming step. Only this will ensure a uniform coating of the sheet metal element or strip as well as an adequate bonding of the resulting catalyst.

The starting sheet metal element or starting strip may consist of virtually any desired metal. Iron, steel, copper or nickel are preferred, particularly for reasons of cost.

Known materials, which have been described, e.g., in Austrian Patent Specification No. 206,867, can be used as skeleton metals and in the Raney alloy. Iron, nickel or cobalt are preferred for the skeleton and iron-, nickel-, cobalt- or silver-base alloys as Raney alloys.

The skeleton material and the Raney alloy are suitably applied in the form of a suspension comprising preferably a water-alcohol mixture and a binder, such as starch, in an amount of 0.25% by weight. The weight ratio of skeleton material and Raney alloy to suspending medium should be in a range of approximately (2 to 4):1.

When the suspension has been applied, it is dried so that the suspending medium is evaporated.

The bond strength of the finished catalytic surface structure can be improved in that a bonding layer, e.g., of iron, cobalt, nickel, lead, silver or copper, is formed on the sheet metal element or strip before the skeleton material and Raney alloy are applied. Such bonding layer may be formed by electrodeposition or by application of the corresponding metal salt and subsequent reduction thereof to the metal.

In selecting the quantity of mixture to be applied per unit of area of the sheet metal element or strip, it must be borne in mind that cold-forming results in an increase of the surface area of the strip or sheet metal element. For instance, cold-working to a deformation of 50% means a virtual doubling of the original surface area so that in the present example a coating having the same thickness as that obtained without cold-forming can be obtained only if twice the quantity of mixture is applied per unit of area of the starting sheet metal element or starting strip. Whereas there is no upper limit to the thickness of the catalytic surface layer and a lower limit is imposed by the decrease in activity, the greatest advantage regarding the ratio of activity to material expenditure will be obtained if the mixture is applied in such a quantity that the catalytic surface layer of the finished product has a thickness of 10 to 300 microns.

Since cold-forming changes not only the thickness of the catalyst layer but also the thickness of the starting sheet metal element or starting strip, the latter change must also be taken into account. For this reason, the starting sheet metal element or starting strip must have such a thickness that the sheet metal element or strip that has been cold-formed to a certain deformation has a thickness that is adequate from the aspect of mechanical stability.

In principle, roll cladding with simultaneous cold-forming can be carried out in one step. It will be particularly desirable, however, to effect cold-forming in a plurality of steps, preferably in two steps. Whereas the mixture can be applied in a plurality of steps after respective forming steps, it is recommendable to apply the mixture in the entire quantity that is required before the first cold-forming step.

If cold-forming is carried out in a plurality of steps, it is recommendable to carry out interstage annealing treatments in a reducing atmosphere. This annealing is carried out under conditions similar to those of the sintering step, which is preferably effected at temperatures between 600° and 1000° C. and particularly at temperatures between 700° and 800° C. It will be understood that only reducing atmospheres may be used which do not enter into an undesired reaction with the catalytic surface structure. Hydrogen is most highly recommended for the formation of the reducing atmosphere.

By means of the process according to the invention, the sheet metal elements or starting strip can be coated on one side or two sides. At least two cold-forming steps are carried out for a coating on two sides. In such process the mixture is applied to one side first. This is succeeded by cold-forming. The mixture is then applied to the second side. This step is followed by another cold-forming step. Both layers will then be jointly subjected to any subsequent forming steps and interstage annealing treatments and to the sintering treatment.

Roll cladding with simultaneous cold-forming is carried out as is usual for cold-forming, suitably by means of a pair of pressure-applying rolls, which are installed in a roll stand. The pressure to be applied by the rolls will mainly depend on the properties of the starting sheet metal element or starting strip. For instance, a roll pressure of at least 3370 kg/cm$^2$ is required to deform ST 37.2 steel.

In the process of manufacturing the sheet metal element or strip having a catalytic surface structure, sintering in a reducing atmosphere is essential. That sintering can be combined in one operation with any interstage anneal carried out to facilitate subsequent process steps. If an interstage anneal is not intended, sintering is carried out after the forming step or steps and before the leaching step by which the soluble component of the Raney alloy is removed. The sintering and leaching steps are carried out in known manner, e.g., as described in Austrian Patent Specification No. 206,867. It is preferred to sinter in a hydrogen atmosphere and to leach with an alkaline solution. An acid solution can also be used.

The sheet metal elements or strips which have been manufactured by the process according to the invention and possess a catalytic surface structure may be cut to any desired size or shaped to form spherical bodies, depending on their intended use. The coated sheet metal elements or strip may also be cut to form U-shaped slits, which define tongues that are subsequently struck up and, e.g., when the products of the process are used as electrodes of diaphragm cells or membrane cells, serve as spacers and as supports for the diaphragm or membrane.

If the intended shaping involves high bending stresses, e.g., in the manufacture of tubular catalytic elements, it is recommendable to roll-clad the substrate with the mixture of skeleton material and Raney alloy during a cold-forming step resulting in a deformation in the upper part of the range claimed, at about 50 to 60%.

The sheet metal elements or strip which have a catalytic surface structure and have been made by the process according to the invention can be used as such or after having been brought to the desired size and/or shape, also for those operations for which DSC electrodes are usualy employed. Particularly desirable applications are the use as electrodes for electrolysis, particularly in the electrolysis of alkali chloride or of water, and for the electrolytic production of salts of oxyacids of chlorine, or as a catalyst for chemical oxidation-reduction processes.

The invention will be explained more fully and by way of illustration in the Examples.

EXAMPLE 1

The starting sheet metal element consists of ST 37 steel (hot-rolled steel) and hade a size of 150×200×3 mm. It was cleaned by being blasted with steel grit, treated with a steel brush, and degreased with perchloroethylene.

12 g of a mixture consisting of
42% by weight Raney nickel alloy (Al:Ni=1:1)
7.5% by weight molybdenum
0.5% by weight titanium
50% by weight Mond nickel (carbonyl nickel)
were stirred into 1.5 g water, 3 g spirit and 30 mg starch to form a suspension, which was applied by means of a doctor to one side of the sheet metal element on an area of 130×165 mm. This was followed by drying at 100° C. in a drying cabinet. The sheet metal element was then rolled to a reduction in thickness of 30% in the first pass and of 50% in the second pass (with reference to the thickness before the first pass).

The resulting sheet metal element was treated in a hydrogen atmosphere at 750° C. for 30 minutes and was then rolled in a third pass to a total deformation of 75%.

The sheet metal element then has a size of 152×750×0.75 mm.

11 mm wide strips were cut off from the sheet metal element at each longitudinal edge so that the remaining sheet metal element had a width of 130 mm. U-shaped slits were then cut into the sheet metal element to define tongues 3 mm wide, which were subsequently struck out in a depth of 2 mm. The aluminum was then dissolved out with 25% caustic potash solution.

The resulting sheet metal element had a catalytic surface structure which has a thickness of 200 microns and a satisfactory bond strength.

When this sheet metal element was used as a cathode in the electrolysis of water at a current density of 2000 A/m$^2$, the hydrogen overvoltage measured against a normal hydrogen electrode amounted to 25 mV.

EXAMPLE 2

A sheet metal element having the properties stated in Example 1 and a size of 200×75×3 mm was cleaned as described in Example 1.
4 g of a mixture consisting of
50% Mond nickel and
50% Raney silver alloy (Al:Ag=1:1)
were stirred into 0.5 g water, 1 g spirit and 10 mg starch to form a suspension and was applied by means of a doctor to the cleaned sheet metal element, which was then dried at 100° C. in a drying cabinet. The sheet metal element was subsequently rolled to a reduction in thickness of 35% in a first pass and to a reduction in thickness of 50% (with reference to the thickness before the first pass) in a second pass.

The resulting sheet metal element was sintered in a hydrogen atmosphere at 700° C. for 30 minutes and was then rolled in a third pass to a total deformation of 75%. The deformed sheet metal element had a size of 730×76×0.77 mm.

A test specimen which as 14 mm in diameter was punched out of the resulting sheet metal element having a catalytic surface structure and was treated with caustic potash solution to remove the aluminum.

The catalytic surface structure has a thickness of 40 microns and a satisfactory bond strength. When the sheet metal element was used as an anode in the electrolysis of water at a current density of 2000 A/m$^2$, the decomposition potential measured against a normal hydrogen electrode amounted to 1.5 volts.

What is claimed is:

1. In a process for manufacturing a sheet metal element or strip having a catalytic surface structure wherein a mixture comprising a skeleton powder and Raney alloy powder in a ratio of 1:3 to 3:1 is applied to a sheet or strip, bonded thereto by a roll of cladding, sintered in a reducing atmosphere at a temperature above 600° C. and treated with an alkaline or acid solution to dissolve out the soluble component of the Raney alloy the improvement wherein said sheet metal element or strip is cold-formed during said process with a deformation of 20 to 60% in any one forming step.

2. A process according to claim 1 wherein said starting sheet or strip is one comprising iron, steel, copper, or nickel.

3. A process according to claim 1 wherein said skeleton powder comprises iron, nickel or cobalt.

4. A process according to claim 1 wherein said Raney alloy comprises iron, nickel, cobalt or silver-base Raney alloy.

5. A process according to claim 1 wherein said mixture of skeleton powder and Raney alloy powder is applied in such a quantity that the catalytic surface structure of the finished product has as a thickness of 10 to 300 microns.

6. A process according to claim 1 wherein said cold-forming is carried out in a plurality of steps.

7. A process according to claim 6 wherein said cold-forming is carried out in two steps.

8. A process according to claim 1 wherein a plurality of cold-forming steps is employed and between any two consecutive cold-forming steps an interstage annealing treatment is performed in a reducing atmosphere.

9. A process according to claim 1 wherein said sintering is effected at a temperature of between 600° and 1000° C.

10. A process according to claim 9 wherein the sintering is effected at a temperature between 700° and 800° C.

11. An electrode formed by the process of claim 1.

* * * * *